United States Patent [19]
Smyth

[11] 3,868,356
[45] Feb. 25, 1975

[54] N-ACYLATED, O-SUBSTITUTED INSULIN DERIVATIVES

[75] Inventor: Derek George Smyth, London, England

[73] Assignee: National Research Development Corporation, London, England

[22] Filed: Jan. 26, 1972

[21] Appl. No.: 221,059

[30] Foreign Application Priority Data
Jan. 28, 1971  Great Britain ...................... 3388/71

[52] U.S. Cl............................... 260/112.7, 424/178
[51] Int. Cl... C07c 103/52, C07g 7/00, A61k 17/04
[58] Field of Search ....... 260/112.7, 112.5; 424/178

[56] References Cited
UNITED STATES PATENTS

| | | | |
|---|---|---|---|
| 3,308,028 | 3/1967 | DeVries | 260/112.7 |
| 3,471,464 | 10/1969 | Bellet et al. | 260/112.7 |
| 3,481,917 | 12/1969 | Grant et al. | 260/112.7 |
| 3,528,960 | 9/1970 | Haas | 260/112.7 |
| 3,591,574 | 7/1971 | Fenichel et al. | 260/112.7 |
| 3,684,791 | 8/1972 | Geiger et al. | 260/112.7 |

FOREIGN PATENTS OR APPLICATIONS
1,157,528   7/1969   Great Britain ................... 260/112.7

OTHER PUBLICATIONS

Tietze et al., Biochim. Biophys. Acta., 59, 336–346, (1962).
Fraenkel-Conrat et al., Biochim. Biophys. Acta., 5, 92–93. (1950).

Primary Examiner—Lewis Gotts
Assistant Examiner—Reginald J. Suyat

[57]  ABSTRACT

Insulin derivatives which are water soluble, readily isolated, immunologically acceptable and which retain hypoglycaemic activity are those in which at least one of the $A_1$, $B_1$ and $B_{29}$ aminoacid amino groups is converted into a blocked amino group having a substituent capable of forming an anion e.g. by substitution with dicarboxylic acid radicals. An additional refinement comprises blocking tyrosine hydroxyl groups with substituents which are releasable in vivo thereby achieving latent activity which is revealed progressively in order to provide prolonged action.

22 Claims, No Drawings

N-ACYLATED, O-SUBSTITUTED INSULIN DERIVATIVES

This invention relates to insulin derivatives.

As more comprehensive methods of detection of diabetes mellitus are introduced and as the normal expectation of life becomes longer the recorded incidence of this disease is increasing steadily. Present treatment consists of dietary control usually in combination with insulin injections or with an oral anti-diabetic drug and in frequent cases injections once or twice daily are necessary throughout the life of the patient. Even with such treatment the patient's blood sugar level varies considerably from normal necessitating a strict diet. Oral drugs are suitable only in mild cases of diabetes and are now considered to have certain undesirable side effects. In addition to the above mentioned disadvantages of present treatment, a proportion of diabetics produce antibodies to insulin and become increasingly resistant to its action.

It is the object of this invention to produce improved therapeutic agents which provide better control of blood sugar level than is achieved by present methods of treatment. To this end, research has been pursued into the properties of insulin derivatives, a field in which in spite of the efforts of many investigators few definite conclusions have emerged hitherto, due largely to failure to separate and adequately identify the individual components of the complex mixture which results from acylation and other reactions to which the parent insulins have been subjected.

More specifically one of the aims of the present invention is to produce insulin derivatives which are readily water-soluble, readily isolated from a reaction mixture, which have acceptable immunological properties and which retain an appreciable measure of the hypoglycaemic activity of the parent substance.

In accordance with this invention insulin derivatives fulfilling the above mentioned objects to a marked extent are those in which at least one of the amino groups of the $A_1$ (glycine), $B_1$ (phenylalanine) and $B_{29}$ (lysine) amino acid units is converted into a blocked amino group having a substituent capable of forming an anion and at least one of the tyrosine hydroxyl groups is blocked by a substituent which is releasable in vivo to restore the free hydroxyl group. Preferably the substituent on the amino group is one which when ionised carries a resultant negative charge and is thus free, for example, of other radicals such as amino groups which could confer overall electrical balance on the substituent.

Advantageously, at least two, and desirably all three, of the recited amino groups are converted to blocked amino groups by replacement of one or more hydrogen atoms therein.

The new insulin derivatives defined above are derived usually in two stages. In the first stage, blocking of the amino group or groups is effected, as described in co-pending application Ser. No. 221,060 of Derek George Smyth and Arthur Sai Chun Ko of even date herewith, following which blocking of the hydroxyl group or groups and any residual free amino groups is achieved in the second stage, the two stages usually requiring somewhat different reaction conditions. Blocking of tyrosine hydroxyl groups usually gives rise to a relatively inactive derivative but whereas amino group blocking is generally of a permanent nature, tyrosine blocking is intended as a temporary measure, the compound reverting slowly in vivo to its biologically active precursor. The latter effect takes place as a result of enzymic or chemical hydrolysis in vivo and depending on the choice of blocking group the rate of reversion will differ from derivative to derivative. The purpose of tyrosine blocking is to reduce the initial hypoglycaemic effect upon administration of the substance thereby enabling a higher dosage to be administered. Gradual reversion to an active derivative results therefore in a more level pattern of control of blood sugar. The overall effect aimed at employing insulin derivatives in this manner is one of prolongation of hypoglycaemic action.

Derivatives provided by this invention have caused a hypoglycaemic effect which has persisted for longer periods than that of the 4th International standard for insulin when tested on the guinea pig.

For convenience the principles which apply to the blocking of amino groups and hydroxyl groups will be discussed separately.

AMINO GROUP BLOCKING

One especially convenient type of blocking group for the purposes of the present invention is the acyl group and outstanding results have been obtained by controlled acylation of the parent insulins with functional derivatives of di-acids such as, for example, dicarboxylic acids, employing the appropriate acid anhydrides, acid halides or equivalent reagents. Many of the methods of acylation which are well known and extensively used in the field of peptide chemistry are applicable to the preparation of derivatives according to the invention. Acylation with such reagents results in the formation of N-substituents having free carboxyl groups which readily ionise to increase the overall negative charge on the insulin molecule. As a result of their enhanced negative charge, molecules of the insulin derivative are less liable to aggregate than those of the parent insulin and for this reason are much more readily soluble in aqueous solvents. Furthermore, this property may also account for the observed reduction in antigenicity of the acyl and other derivatives which constitutes a highly inportant property of the new derivatives of the present invention (antigenicity against antibodies directed against insulin).

A wide variety of dicarboxylic acid acyl groups may be introduced into the insulin molecule but it is found that the activity of the derivatives falls off after a certain point with increasing size of the substituent groups and for this reason it is preferred that the substituents contain no more than about six or about eight carbon atoms. Particularly good results are obtained with acyl groups derived from succinic, glutaric, maleic, monomethyl maleic and dimethyl maleic acids.

Acylation of insulins with dicarboxylic acid functional derivatives, e.g. anhydrides, is very conveniently amenable to control. If the reaction is carried out with a relatively small excess of acylating agent, e.g. from 2 to 3 moles per amino group and at neutral or mildly alkaline pH, e.g. 7 – 8, the reaction proceeds in very high yield with the formation of the di-substituted derivative resulting from reaction of the $A_1$ and $B_1$ amino groups. If the excess of acylating agent is markedly increased, e.g. up to 10 molar, the reaction can be made to proceed at the $B_{29}$ amino group to form the tri-substituted derivative. At a pH in the contemplated range the reaction is uncomplicated by O-acylation of tyrosine residues because stable O-acyl derivatives are not formed under these conditions. The resulting derivatives are insoluble at acid pH and may thus be readily removed from the reaction mixture by precipitation e.g. at pH 3. The products so obtained can be separated by filtration or centrifugation and formulated as dry easily manageable powders. The products are readily soluble in aqueous media at pH 5 – 8, which simplifies their preparation and administration in comparison with the parent insulins. In some cases certain acyl groups are removed under strongly acid conditions and therefore caution is necessary in the recovery of products by the method described.

As indicated above at least one and preferably two of the insulin amino groups are blocked by anion-forming substituent radicals. The other amino groups in the insulin molecule may be left unsubstituted or, if desired, blocked with groups of the same or a different nature, i.e., not necessarily containing anion-forming radicals, e.g. acetyl, carbamyl, N-substituted-carbamyl, e.g. N-methylcarbamyl and other N-alkyl carbamyl radicals. It is further contemplated that derivatives containing a variety of blocking groups in the same molecule may be desirable in order to achieve optimal prolongation effects due to improved resistance to aminopeptidase. Moreover, the use of mixtures of derivatives which allow optimisation of effects or other advantageous control of therapy is contemplated in accordance with this invention.

Typical products produced in accordance with the invention, e.g. the di- and tri- succinyl derivatives have been found to possess comparable but usually less initial hypoglycaemic activity than the parent insulins. This enables higher dosages to be used and because of the tendency of the derivatives to persist longer in the body, the effect is one of prolongation of hypoglycaemic action.

HYDROXYL GROUP BLOCKING

Insulin derivatives containing O-acyl groups at one or more tyrosine residues in addition to the one or more N-acyl groups are also envisaged in accordance with this invention. Usually O-acylation will require different conditions from N-acylation. Thus the amounts of reagent required are usually in excess of those required for N-acylation and molar excesses of the order of 10 – 50 may be necessary for complete reaction at tyrosine. Also, reaction pHs are higher, for example about 9; due note being taken of the potential lability of O-acyltyrosine compounds at these higher pHs so that the pH of the reaction mixture is lowered as soon as the required degree of reaction has occurred. In addition, with O-acylation different acylating groups may be required for best results. Thus, as indicated above, succinyl and certain other groups which are excellent N-blocking groups are not sufficiently stable as O-blocking groups. As O-acylation almost invariably results in an inactive derivative, it is essential, for activity to be expressed, that the O-blocking group should be removed in vivo. Therefore the choice of blocking reagent will be determined by the desired degree of stability of the blocked hydroxyl groups. Acetyl and glutaryl groups, for example, are for these reasons preferred to succinyl groups. Cyclic radicals, which offer steric hindrance to hydrolysis and therefore provide delay in the reversion to an active substance are also attractive e.g. cyclopropane-carbonyl, and cyclobutane carbonyl. Furthermore, there are four tyrosine residues in the insulin molecule and both partial and complete tyrosine blocking are within the scope of this invention. Tyrosine acylation or other form of blocking may be readily monitored by measuring the decrease in the characteristic tyrosine absorption peak at about 275 millimicrons. For example an tri-N-substituted derivative can be acylated incrementally and the reaction terminated when the reduction in absorption indicates that the desired degree of substitution has taken place. When tyrosine residues are acylated it is found that two hydroxyl groups are readily blocked whereas the other two are more difficult of access.

Alternatives to acylation are possible for the blocking of hydroxyl groups and superior results have been obtained by carbamylation which is conveniently carried out, for example, by reaction with an alkali metal cyanate. In order to take account of the problem of the innate. instability of O-carbamyl groups at higher pHs (e.g. 8) and the instability of the reagent at lower pHs (e.g. 6) the pH is generally decreased in stepwise fashion during the reaction (e.g. starting at 8 and finishing at 6). N-substituted carbamyl groups may also be introduced. Carbamylation is a relatively time consuming reaction and it is found in practice that an equilibrium mixture is obtained in which it is rare to achieve more than about 70 percent of the maximum theoretical extent of blocking.

The methods and groups used will be determined partly by considerations of ease of isolation of the products but chiefly with reference to the required rate of removal of the group or groups in vivo; the latter may be readily tested for by in vitro hydrolysis experiments which simulate physiological conditions thereby enabling tailoring of the final product to the requirements of particular patients.

The compounds of this invention are conveniently handled and formulated as powders precipitated at acid pH. In such form the derivatives are at the isoelectric point. However physiologically acceptable salts of the derivatives may be used if desired. As with the parent insulins, zinc may be present in some form in the derivatives. Insulin derivatives in accordance with this invention may be formulated as pharmaceutical preparations in the same way as the parent insulins and may be used clinically at lower comparable, or higher dosage levels. Thus the normal daily dosage of insulin is from 20 to 80 international units per day for adults and for resistant patients more than 200 units and in some cases over 500 units of standard insulin. The derivatives of this invention can be prepared as solutions, suspensions, or freeze-dried preparations. A typical solution formulation is a neutral or physiological pH and contains sodium acetate 0.136 percent w/v, sodium chloride 0.7 percent w/v and methyl hydroxybenzoate 0.1 percent w/v in pyrogen - free water.

The present invention is applicable to all insulins and particularly the porcine and bovine insulins which have been used clinically for many years in the treatment of diabetes and other disorders. It is also applicable to synthetic insulins of this type and also to synthetic human insulin.

The invention is illustrated in the following Examples:

Example 1 — Preparation of α-N,N'-ε-N''-trisuccinylinsulin

Succinylation 500 mg of insulin is suspended in 12 ml of 0.5M phosphate buffer pH 7.2 (41.6 mg per ml) and to this suspension is added directly 250 mg solid succinic anhydride (10 fold molar excess of reagent per amino group). The reaction mixture is stirred continuously at room temperature for 20 hours. The clear solution (after reaction) is observed to remain homogeneous when the pH is adjusted to 5.5.

Resalting of the reaction mixture either by (i) or (ii)

(i) The total reaction mixture is passaged through a Sephadex G-15 column (150 × 1.5 cm), eluting with 0.05M pyridine acetate buffer pH 5.5. The insulin derivatives are well separated from the breakdown products of the reagent. The derivatives emerge in a relatively large volume of the choice eluent but are still suitable for chromatography.

(ii) Alternatively, the insulin derivatives are precipitated at 4°C by acidification of the reaction mixture to pH 3.8 with glacial acetic acid. The precipitate is then washed twice with cold distilled water previously acidified to pH 4 with acetic acid. The yield of the insulin derivatives in the precipitate is over 90 percent. The precipitate is dissolved in 5 ml of pyridine acetate pH 6 for chromatography.

Purification of the insulin derivatives

The solution of insulin derivatives is applied to a DEAE-Sephadex A-25 column (95 × 1.5 cm). Elution is carried out initially with 60 ml of 0.05M pyridine acetate pH 5.5 before a linear NaCl gradient to the limiting concentration of 2.0M is applied. The disuccinylated derivative is eluted off the A-25 gel first at the NaCl molarity of 0.475; the trisuccinylated — at 0.6. Separation of the derivatives in this manner is readily accomplished without the use of 7M urea in the eluent and the yield of the derivatives is over 90 percent.

Characterisation of the derivatives

The pure insulin derivative obtained is either resalted suitably with a Sephadex G-15 column or precipitated as previously. Further washing of the precipitate with cold 95 percent ethanol followed by diethyl ether (twice) prior to drying in a vacuum desicator results in a white powder which is then characterised by:

i. Tryptic digestion at pH 9.5 with a T.P.C.K.-treated trypsin to substrate ratio of 1 to 7 for the release of B-30 alanine.

II. Cellulose acetate electrophoresis and staining with Pancean S.

III. Carbamylation with KCNO for quantitative assay of -NH$_2$ terminal groups.

IV. Disc-gel (acrylamide) electrophoresis.

Using this method of preparation, the yields of the tri- and disuccinylated derivatives are 90.6 percent and 9.3 percent respectively. No -NH$_2$ terminal end groups can be detected for either derivative. Free alanine can be liberated by tryptic digestion from the disuccinylated derivative; and none from trisuccinylinsulin. The two derivatives can be separated by electrophoresis.

Example 2 — Preparation of α-N,N'-disuccinylinsulin

In order to prepare disuccinylinsulin specifically, the succinylation reaction conditions described in Example 1 are altered thus: three molar excess of succinic anhydride per amino group and reaction for 4 hours at room temperature. The reaction mixture is desalted by precipitation and the insulin derivative dissolved in pH 8 buffer and allowed to stand at room temperature for 20 hours before purification.

Example 3 — Preparation of α-N-succinylphenylalanineinsulin α-N-succinylglycineinsulin, ε-N-succinyllysineinsulin and α-N-succinylglycine-ε-N-succinyllysineinsulin These derivatives are prepared, together with those of Examples 1 and 2, by the use of different succinylation reaction conditions, the various derivatives being separated chromatographically.

Reaction of insulin with succinic anhydride

Bovine crystalline insulin (200 mg, containing 0.336 percent zinc) is dissolved in 10 ml M-tris HCl pH 8.6. To this is added succinic anhydride (20.4 mg, equivalent to two fold molar excess per amino group). The reaction mixture is stirred at room temperature for 3 hours. The insulin derivatives are desalted by gel filtration on a column (35 × 2.5 cm) of Sephadex G-25 (coarse grade) in 0.1 percent N-ethylmorpholine acetate pH 8.5 and isolated by lyophilization.

Chromatographic separation of the insulin derivatives

The freeze-dried mixture is dissolved in 5 ml of 0.1M-tris HCl pH 7 containing 8M urea (freed from cyanate by acidification) and added to a DEAE Sephadex A-25 column (95 × 1.5 cm) which is equilibrated and developed initially with 200 ml of the above buffer. A linear gradient of NaCl is then applied up to a limiting concentration of 0.2M by passing 0.1M-tris pH 7 containing 8M urea and 0.2M NaCl (250 ml) into a mixing vessel containing 250 ml of the starting buffer. The flow rate is 15 ml per hour. With this chromatographic procedure, 6 insulin derivatives are obtained as indicated in the following table:

| Compound | NH$_2$Groups substituted (1) | Molarity of NaCl at which eluted M | Yield % |
|---|---|---|---|
| Insulin | — | — | 40 |
| α-N-succinyl-phenylalanineinsulin (B$_1$ substituted) | Phe | — | 14 |
| ε-N-succinyllysineinsulin (B$_{29}$ substituted) | Lys | — | 3 |
| α-N-succinylglycineinsulin (A$_1$ substituted) | Gly | — | 12 |
| α-N,N'-disuccinylinsulin (A$_1$B$_1$ substituted) | Phe, Gly | 0.12 | 12 |
| α-N-succinylglycine-εN-succinyllysineinsulin (A$_1$B$_{29}$ substituted) | Gly, Lys | 0.13 | 8 |
| α-N,N'-ε-N''-trisuccinylinsulin (A$_1$B$_1$B$_{29}$ substituted) | Gly, Phe, Lys | 0.2 | 7 |

(1) The free α-NH$_2$ groups are determined as for characterisation method (iii) of Example 1 whilst the ε-NH$_2$ groups are determined as for characterisation method (i) of Example 1.

Example 4 — Preparation of α-N',ε-N''-triglutarylinsulin

This derivative is prepared using glutaric anhydride by an exactly analogous procedure to that described in Example 1 for the trisuccinyl derivative.

Example 5 — Preparation of α-N,N'-disuccinyl-ε-N''-carbamylinsulin

Pure disuccinylinsulin is carbamylated at pH 8 with 0.5M KCNO. The reaction mixture is stirred at room temperature for 12 hours and then desalted by passage through a Sephadex G-15 column (150 × 1.5 cm) with 0.05M phosphate buffer pH 9. No free alanine can be liberated from the resultant derivative by tryptic digestion.

In an alternative procedure the buffer used in the desalting is 0.1 percent N-ethylmorphaline acetate at pH 8.5.

Example 6 — Preparation of O-acetylated α-N,N'-ε-N''-trisuccinylinsulin

α-N,N'-ε-N''-trisuccinylinsulin (6 mg) prepared according to Example 1 is dissolved in 0.5M tris buffer (pH 9.0, 3 ml) and is treated with acetic anhydride in successive aliquots of 5, 5, 10, 10, 10 microlitres at room temperature stirring well after each addition. The reaction is monitored after each addition by measuring the spectral absorption at 275 microns. The final product is estimated to be approximately 80 percent substituted at the hydroxyl groups. The product is precipitated by adjustment of the pH of the solution to 4.0 with acetic acid and is recovered by centrifugation. The product, when tested in vitro by hydrolysis at pH 7.4 and 37°C, has a half life of about 14 hours.

Example 7 — Preparation of O-glutaryl derivative of α-N,N'-ε-N''-trisuccinylinsulin α-N,N'-ε-N''-trisuccinylinsulin (6 mg) is dissolved in 0.25M phosphate buffer (pH 8.0, 3 ml) and treated with a solution of glutaric anhydride in dioxan (50 percent w/v) in successive aliquots of 1, 1, 1, 3, 3, 5, 5, 10, 10 microlitres and the reaction monitored as described in Example 6. The product is precipitated by adjustment of the pH of the solution to 3 or lower with hydrochloric acid and is recovered by centrifugation. The corresponding half life (see Example 6) is about 7 hours.

EXAMPLE 8 — O-carbamylation of α-N,N'-ε-N''-trisuccinylinsulin

α-N,N'-ε-N''-trisuccinylinsulin (200 g) is dissolved in 8M aqueous urea and potassium cyanate is added to a concentration of 2M. The reaction is allowed to continue at room temperature at pH 8.0 for 1 hour, pH 7.0 for 4 hours, pH 6.5 for 2 hours and then pH 6.0 for 1 hour, the pH being maintained at the required value as the experiment continues by the automatic addition of acetic acid. The reaction mixture is then acidified to pH 4.5 by the addition of hydrochloric acid, diluted fivefold with water and allowed to stand at 4°C overnight. The precipitate formed is spun off and redissolved in 0.1 percent aqueous pyridine acetate at pH 6.0. Desalting is effected with a column (40 × 2.5 cm) of Sephadex G-25 using 0.1 percent pyridine acetate at pH 6.0 as eluant, the elution being carried out at 4°C. Immediately the elution of the protein from the column is complete the fractions are combined and the product isolated in dry form by lyophilisation. The degree of carbamylation is in the region of 50 percent as assayed by the measurement of optical density at 200 nm. The half life of decarbamylation of the product at pH 7.4 and 37°C in physiological buffer is 75 minutes with full return of the tyrosine absorption of the trisuccinylinsulin.

I claim:

1. A substituted insulin in which the substituents are located on one or more of the amino groups of the $A_1$(glycine), $B_1$(phenylalanine), and $B_{29}$(lysine) amino acid units and on one or more of the tyrosine hydroxyl groups, at least one of said amino groups is monoacylated with the monobasic acyl residue of a dicarboxylic acid containing no more than eight carbon atoms, and at least one of the tyrosine hydroxyl groups is blocked by an O-substituent selected from the group consisting of acetyl, glutaryl, cyclopropanecarbonyl, cyclobutanecarbonyl and carbamyl.

2. An insulin according to claim 1 in which at least one of the tyrosine hydroxyl groups is blocked by carbamyl.

3. An insulin according to claim 1 in which the acid is succinic acid.

4. An insulin according to claim 1 in which two of the amino groups are substituted.

5. An insulin according to claim 4 in which the $A_1$ and $B_1$ amino groups are substituted.

6. An insulin according to claim 4 in which the $A_1$ and $B_{29}$ amino groups are substitued.

7. An insulin according to claim 4 which is tri-N-substituted.

8. An insulin according to claim 1 in which one or two of the amino groups which are not acylated are carbamylated or N-alkyl carbamylated.

9. An insulin according to claim 1 in which two or more of the hydroxyl groups are substituted.

10. An insulin according to claim 1 in which the hydroxyl blocking sutstituent is carbamyl.

11. An insulin according to claim 1 wherein the acid is glutaric acid.

12. An insulin according to claim 1 wherein the acid is selected from the group consisting of maleic acid, monomethylmaleic acid and dimethylmaleic acid.

13. An insulin according to claim 1 in which at least one of the tyrosine hydroxyl groups is blocked by acetyl or glutaryl.

14. An $A_1$(glycine)-N-succinyl-$B_1$(phenylalanine), $B_{29}$(lysine)-N',N''-dicarbamyl mono-, di-, tri- or tetra-O-carbamyl insulin.

15. A $B_1$(phenylalanine)-N-succinyl-$A_1$(glycine), $B_{29}$(lysine)-N',N''-dicarbamyl mono-, di-, tri- or tetra-O-carbamyl insulin.

16. A $B_{29}$(lysine)-N-succinyl-$A_1$(glycine), $B_1$(phenylalanine)-N',N''-dicarbamyl mono-, di-, tri-, or tetra-O-carbamyl insulin.

17. An $A_1$(glycine), $B_1$(phenylalanine), $B_{29}$(lysine)-N,N',N''-tri-succinyl mono-, di-, tri- or tetra-O-carbamyl insulin.

18. An $A_1$(glycine), $B_1$(phenylalanine), $B_{29}$(lysine)-N,N',N''-tri-glutaryl mono-, di-, tri- or tetra-O-carbamyl insulin.

19. An $A_1$(glycine), $B_1$(phenylalanine)-N,N'-disuccinyl-$B_{29}$(lysine)-N-carbamyl mono-, di-, tri- or tetra-O-carbamyl insulin.

20. A process for the preparation of an insulin according to claim 1 which comprises acylating one or more of the $A_1$, $B_1$ and $B_{29}$ amino groups with an excess of 2 to 3 moles for each of said amino groups of a dicarboxylic acid halide or anhydride containing no more than eight carbon atoms, per mole of insulin for the mono- and di-substituted insulins and an excess of about 10 moles for each of said amino groups per mole of insulin for tri-substituted insulins and thereafter blocking at least one of the tyrosine hydroxyl groups with 10 to 50 moles of said O-substituent per mole of insulin.

21. Process according to claim 20 in which an excess of the dicarboxylic acid halide or anhydride of from two to three moles for each of said three amino groups is used thereby effecting predominantly disubstitution of said amino groups.

22. Process according to claim 20 in which an excess of the dicarboxylic acid halide or anhydride of the order of ten moles for each of said three amino groups is used thereby effectint predominantly trisubstitution of said amino groups.

* * * * *